United States Patent [19]

Berggren

[11] Patent Number: 5,036,119

[45] Date of Patent: Jul. 30, 1991

[54] PROCESS FOR PREPARING BITUMINOUS COMPOSITION

[75] Inventor: Mark A. Berggren, Houston, Tex.

[73] Assignee: Shell Oil Company, Houston, Tex.

[21] Appl. No.: 422,194

[22] Filed: Oct. 16, 1989

[51] Int. Cl.$^5$ ............................ C08J 3/22; C08J 95/00
[52] U.S. Cl. .......................................... 523/351; 524/68
[58] Field of Search ............................ 524/68; 523/351

[56] References Cited

U.S. PATENT DOCUMENTS

| | | | |
|---|---|---|---|
| T964,011 | 11/1976 | Blanken | 428/489 |
| 3,203,916 | 8/1965 | Voet | 523/356 |
| 3,265,765 | 8/1966 | Holden et al. | 260/876 |
| 3,345,316 | 10/1967 | Nielsen | 260/28.5 |
| 3,669,918 | 6/1972 | Raley Jr. | 260/28.5 |
| 3,755,231 | 8/1973 | Muir et al. | 260/28.5 |
| 3,978,014 | 8/1976 | van Beem et al. | 260/28.5 |
| 4,032,491 | 6/1977 | Schoenke | 260/28.5 |
| 4,321,168 | 3/1982 | Ueda et al. | 524/61 |
| 4,490,493 | 12/1984 | Mikols | 524/68 |
| 4,738,997 | 4/1988 | Lundberg et al. | 524/68 |
| 4,743,497 | 5/1988 | Thorsud | 524/68 |
| 4,755,545 | 7/1988 | Lalwani | 524/68 |
| 4,837,252 | 6/1989 | Seguin et al. | 523/351 |

FOREIGN PATENT DOCUMENTS

| | | |
|---|---|---|
| 987413 | 4/1976 | Canada. |
| 1143895 | 2/1969 | United Kingdom. |
| 1481506 | 8/1977 | United Kingdom. |
| 2094226 | 9/1982 | United Kingdom. |

*Primary Examiner*—Allan M. Lieberman

[57] ABSTRACT

A process is provided to prepare a composition of bitumen, carbon black, and a block copolymer, the block copolymer being a hydrogenated or unhydrogenated block copolymer comprising, before hydrogenation, at least two blocks which comprise predominantly polymerized monoalkenyl arenes and at least one block which comprises predominantly polymerized conjugated diolefins. The process involves blending of the carbon black with the block copolymer and then combining the carbon black-block copolymer mixture with bitumen. The product of the process of this invention has excellent storage stability and aged tensile strength properties, and has superior weatherability.

20 Claims, No Drawings

PROCESS FOR PREPARING BITUMINOUS COMPOSITION

FIELD OF THE INVENTION

This invention relates to a process to prepare a bituminous composition and the product of that process. In another aspect, this invention relates to a bituminous composition which does not phase separate after storage at 160° C. for 5 days.

BACKGROUND OF THE INVENTION

Bitumen is used as paving, roofing, joint compound and adhesives. Bitumen is an inexpensive material for these uses, but has many shortcomings, including low flexibility, low tensile strength and poor resistance to degradation due to exposure to oxygen, sunlight and water. Some of these deficiencies in physical properties may be at least partially overcome by including in the bitumen composition various elastomeric polymers and reinforcing fillers such as carbon black. But the usefulness of these bitumen-polymer compositions is seriously limited by the tendency of elastomeric polymers to be incompatible with the bitumens and to separate into a polymer rich phase and an asphaltene rich phase upon storage.

Raley (U.S. Pat. No. 3,669,918) discloses a blend of bitumen and a random copolymer of propylene and ethylene. The composition is said to have good low temperature elasticity and good high temperature impact strength. The process disclosed to blend the polymer and the bitumen consists of placing the polymer in a hot-roll mill and adding bituminous material portionwise until the desired proportion of bitumen has been added. Alternatively, the copolymer is fluxed into a portion of the molten asphalt, and when a homogenous mixture is obtained, the balance of the asphalt is added. Raley does not disclose a method to combine bitumen carbon black and elastomeric polymers.

Holden (U.S. Pat. No. 3,265,765) provides elastomeric block copolymers A-B-A which may be dispersed in bitumen to improve high temperature viscosity and low temperature ductility and flexibility. The elastomers may be mixed with usual rubber compounding materials such as carbon black. The A blocks of Holden's copolymer are blocks of polymerized alkenyl aromatic hydrocarbons, and the B block is a block of polymerized conjugated diene. A method to prepare such a composition wherein the composition has good storage stability is not disclosed by Holden.

Nielsen (G.B. Specification No. 1,143,895) discloses compositions of bitumen, fillers, carbon black and block copolymers. The block copolymer has an A-B-A configuration where the A blocks are polymerized vinyl-substituted aromatic hydrocarbons, and the B block is an elastomeric block of an alkene, a conjugated diene or a hydrogenated derivative thereof. Nielsen also discloses a process for preparing the composition wherein the carbon black is premixed into a portion of the bitumen, producing a master batch. The copolymer may then be added to the master batch. Alternatively, the copolymer may be blended into the remaining bitumen to form a second master batch and then the two master batches combined. Although the properties of the composition disclosed by Nielsen are excellent, a relatively large amount of block copolymer is required to obtain these properties. The copolymer is considerably more expensive than the other components of the composition, so it would be advantageous to gain the improvements in the bitumen properties achieved by the addition of block copolymers with less copolymer necessary. Applicants have also found that the compatibility of the compositions prepared by the process of Nielsen, as measured by the amount of phase separation during hot storage of the composition, is also deficient.

Van Beem et al. (U.S. Pat. No. 3,978,014) discloses a bituminous composition which is said to have excellent storage stability. Van Beem's bituminous composition comprises: 95–75% by weight of a bituminous component having an aromaticity exceeding $0.004 \times P + 0.280$, where P is the n-heptane asphaltene content; 4–15% by weight of a block copolymer which is preferably a polystyrene-polyakadiene-polystyrene block copolymer and 4–15% by weight of a thermoplastic polymer, different from the block copolymer, which has a molecular weight above 10,000, a solubility parameter of 7.8 to 8.8, and a crystallinity below 60% at 25° C. Van Beem does not disclose a process for combining carbon black in the disclosed bitumen-block copolymer mixture.

It is therefore an objective of the present invention to provide a process for preparing compositions of bitumen, carbon black and block copolymers, the block copolymers containing two or more blocks of a polymerized vinyl substituted aromatic hydrocarbons, and one or more blocks of polymerized conjugated dienes, or hydrogenated derivatives thereof wherein the product of the process has excellent storage stability, tensile properties and weatherability. In another aspect, it is an objective of this invention to provide a bitumen-polymer-carbon black composition which is the product of this process. In another aspect, it is an objective of this invention to provide a bitumen-polymer-carbon black composition which does not phase separate upon high temperature storage. In a preferred embodiment, it is an objective of this invention to provide a roofing composition.

SUMMARY OF THE INVENTION

A process is provided to produce a bitumen composition, the process comprising: providing a carbon black composition, the carbon black composition comprising carbon black and less than 10% by weight bitumen; blending the carbon black with a block copolymer composition, the block copolymer composition comprising a block copolymer and less than 10% by weight bitumen, the block copolymer selected from the group consisting of hydrogenated and unhydrogenated block copolymers, the block copolymers before hydrogenation comprising two or more blocks of predominantly polymerized vinyl arene monomer units and one or more block of predominantly polymerized conjugated diolefin monomer units; and combining the carbon black composition-block copolymer blend with a bitumen. In another aspect, the product of the above process is provided.

It has been surprisingly found that mixing of the carbon black with the block copolymer before the block copolymer is contacted with the bitumen results in a composition having an excellent tensile strength, improved compatibility (as measured by hot storage stability) and improved weatherability.

DETAILED DESCRIPTION

The bitumen of the present invention may have properties which vary widely, depending on the desired consistency of the finished product. Suitable bitumens may have softening points of between about 80° F. and about 220° F. and preferably between about 90° F. and about 120° F. The bitumen may be residues from distillation of straight-run crude oil, produced by cracking straight run or cracked residue, blowing a crude oil or residues of crude oil distillation or extracts of crude oils, bitumens derived from coal tars, propane bitumens, butane bitumens, pentane bitumens or mixtures thereof. Bitumen may also be referred to as asphalt or flux.

The block copolymer useful in the process of this invention may have a linear or a radial configuration. Radial configuration polymers are also known as star polymers, and have a plurality of polymeric arms extending from a central coupling agent.

Linear block copolymers which may be utilized in the process of the present invention may be represented by the following general formula:

$$A_z-(B-A)_y-B_x$$

wherein:
- A is a polymeric block comprising predominantly monoalkenyl aromatic hydrocarbon monomer units;
- B is a polymeric block comprising predominantly conjugated diolefin monomer units or its hydrogenated derivative;
- x and z are, independently, 0 or 1; and
- y is an integer ranging from 1 to about 15.

Radial polymers which may be utilized in the process of this invention may be represented by the following general formula:

$$[B_x-(A-B)_y-A_z]_n-C; \text{ and}$$

$$[B_x-(A-B)_y-A_z]_{n'}-C-[B']_{n''}$$

wherein:
- A, B, x, y and z are as previously defined;
- n is a number from 3 to 30;
- c is the core of the radial polymer formed with a polyfunctional coupling agent;
- B' is a polymeric block comprising predominantly conjugated dioelfin units, which B' may be the same or different from B; and
- n' and n" are integers representing the number of each type of arm and the sum of n' and n" will be a number from 3 to 30.

It is preferred that the A blocks have a number average molecular weight between about 5000 and about 35,000 each while the block B should each have a number average molecular weight between about 20,000 and 300,000. It is more preferred that the A blocks each have a number average molecular weight between about 7,500 and 30,000, and each B block has a number average molecular weight between about 30,000 and about 150,000. It is most preferred that the A blocks each have a number average molecular weight between about 10,000 and about 20,000, and each B block has a number average molecular weight between about 45,000 and about 75,000. Number average molecular weights are preferably measured by gel permeation chomatography with a polystyrene standard.

Blocks A and B may be either homopolymer, random or tapered copolymer blocks as long as each block is predominantly the class of the monomer characterizing the block. For example, the block copolymer may contain A blocks which are styrene/alpha-methylstyrene copolymer blocks or styrene/butadiene random or tapered copolymer blocks as long as the blocks individually predominate in alkenyl arenes. The A blocks are preferably monoalkenyl arene homopolymer blocks. The term "monoalkenyl arene" will be taken to include those of the benezene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

By predominantly being the class of the monomer characterizing the block, it is meant that more than about 75% by weight of the A blocks are vinyl arene monomer units, and more than about 75% by weight of the B blocks are conjugated diene monomer units.

The blocks B may comprise homopolymers of conjugated diene monomers, copolymers of two or more conjugated dienes, and copolymers of one or more of the dienes with a vinyl arene as long as the blocks B are predominantly conjugated diene units. The conjugated dienes preferably contain from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene) and 1,3-hexadiene.

Preferably, the block copolymers of conjugated dienes and vinyl arene hydrocarbons which may be utilized include those butadiene derived elastomers which have 1,2-microstructure contents prior to hydrogenation of from about 7 to about 100 percent, more preferably from about 25 to about 65 percent, and most preferably from about 35 to about 55 percent. The proportion of the copolymer which is alkenyl arene monomer units is between about 1 and about 60 percent by weight of the block copolymer, preferably between about 5 and about 50 percent, more preferably between about 15 and about 45 percent by weight and most preferably between about 20 and about 40 percent by weight.

The A blocks, e.g., polystyrene blocks, preferably comprise between about 5 and about 50% by weight of the total block copolymer, more preferably comprise between about 25 and 35% by weight of the total block copolymer and most preferably comprise between about 28 and about 32% by weight of the total block copolymer.

The block copolymers may be produced by any block polymerization or copolymerization procedures including sequential addition of monomer techniques, incremental addition of monomer technique or coupling technique as illustrated in, for example, U.S. Pat. Nos. 3,251,905; 3,390,207; 3,598,887 and 4,219,627, which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, which are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These copolymers are preferably hydrogenated to increase their thermal stability, high temperature properties, and resistance to oxidation. The hydrogenation of these copolymers may be carried out by a variety of processes including hydrogenation in the presence of such catalysts as Raney nickel, noble metals such as platinum, palladium and the like, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, which are incorporated herein by reference. The copolymers are hydrogenated in such a manner as to produce hydrogenated copolymers having a residual ethylenic unsaturation content in the polydiene block of not more than about 20 percent, preferably not more than about 10 percent, most preferably not more than about 5 percent, of their original ethylenic unsaturation content prior to hydrogenation.

Particularly suitable block copolymers, prior to hydrogenation, which may be employed for the present purpose include the following species:

Polystyrene-polyisoprene-polystyrene;
Polystyrene-polybutadiene-polystyrene.

The amount of block copolymer useful in the process of the present invention is preferably from about 2 to about 25 percent by weight based on the amount of bitumen plus block copolymer. The amount of block copolymer more preferred is between about 4 and 15 percent. Higher levels of block copolymer can cause the composition to be relatively expensive and also increase the viscosity of the finished composition excessively. Lower levels of block copolymer, in general, will not form polymeric domains within the bituminous composition and therefore will not provide the desired improvements in the properties of the composition. The block copolymer must not be combined with a significant portion of bitumen before it is mixed with the carbon black because the benefits of process will not be realized. The amount of bitumen present in the block copolymer composition is preferably less than 10% by weight of the block copolymer composition.

The carbon black which may be used in the present invention has a particle size from about 5 to about 500 nanometers. Preferred carbon blacks are those of ASTM grades N660, N550, N330, N110, N220, N761, N762, N601, 5300 and 5301. Most preferred carbon blacks are N-110 (ASTM D-2516) type carbon blacks. An example of this most preferred carbon black is available from Cabot, Boston, Mass. under the trade name Vulcan ® 9A32.

The weight ratio of block copolymer to carbon black may vary from 0.01 to 500. Preferably the ratio is about 1.0 to about 100 and most preferably is about 4 to about 7. The amount of carbon black utilized is most preferably between about 2 and about 25 percent by weight of the amount of bitumen and block copolymer.

Carbon blacks are typically commercially available in pellet form, with particles bound into larger pellets to enhance handling. Commercial binders include naphthenic oils and diblock copolymers of vinyl arenes and conjugated diolefins. The particular binder used is not critical to the practice of the present invention so long as the carbon black composition does not contain more than 10% by weight of bitumen, the percent weight based on the total carbon black composition. Some minimal amount of bitumen may be contained in the carbon black composition without a detrimental effect on the compatibility and other properties of the composition produced by the process of the present invention, but if a significant amount of bitumen is present in the carbon black before the carbon black is admixed with the block copolymer the advantages of the present invention will not be realized. Preferably, less than 10 percent by weight of the carbon black mixture is bitumen, and more preferably, less than about 5 percent by weight of the carbon black mixture is bitumen.

The carbon black mixture is mixed with the block copolymer in a high shear mixing device. An extruder, Banbury, Ferrell continuous mixer, and two roll-mill are preferred as the high shear mixing device of this invention. A most preferred carbon black/block copolymer blending device is a Banbury.

The blending of the block copolymer and the carbon black mixture is preferably performed with the copolymer in a melt phase.

The carbon black mixture-block copolymer composition is then blended with bitumen. This blending is preferably performed using a device capable of mixing the components under a high shear condition. A Silverson mixer or other high shear rotor/stator disintegrator is preferred.

The blending of the carbon black mixture-block copolymer composition with the bitumen is preferably performed with the asphalt initial temperature between about 150° C. and about 180° C., with a final blend temperature of between about 180° C. and about 220° C. At these temperatures, the viscosity of the blend is sufficiently low for mixing, but at higher temperatures, block copolymers could degrade. The residence time of the composition in the mixing device is preferably more than about one hour.

Other fillers, for example silica and calcium carbonate, stabilizers, antioxidants, pigments, and solvents are known to be useful in bitumen compositions and can be incorporated in the composition of this invention in concentrations taught in the art. Polystyrene, functionalized liquid resins and nonfunctionalized liquid resins are also known as advantageous ingredients in bitumen compositions and may be included in the composition taught herein.

Although Applicant is not bound by theory, he believes that the process of the present invention results in stable compositions because chemisorbed oxygen/acidic complexes on the carbon black surface provide interfacial support between polymer rich and polymer lean domains within the bitumen composition. The result is that the contacting of block copolymer with the carbon black prior to contact of the block copolymer with bitumen results in a more stable suspension of the polymer lean (asphaltene) phase in the polymer rich phase. This also results in the block copolymer being more effective in improving the elasticity of the bitumen composition enabling a lower concentration of block copolymer for a similar level of improvement in elasticity tensile strength and other properties.

EXAMPLE 1

The block copolymer used in this example was a hydrogenated polystyrene-polybutadiene-polystyrene block copolymer with a 30% by weight styrene content and a number average molecular weight of 103,000 as measured by GPC with a polystyrene standard. The ethylenic unsaturation of the polymer had been reduced to less than 1% of the original ethylenic unsaturation by hydrogenation.

Bitumen a had a softening point of 100° F. and a penetration of 183 dmm. Bitumen b had a softening point of 112° F. and a penetration of 120 dmm.

The carbon black used in compositions 1 and 2 of this example was obtained from Cabot Corp. of Boston, Mass. and is sold under the trade name Vulcan ® 9A32. This carbon black was a SAF type, and was a grade N-110 (ASTM D-2516). This carbon black was obtained in the form of pellets in which a naphthenic oil was used as a binder. An example of naphthenic oil is available from Shell Oil Company of Houston, Tex. under the trade name Shellflex ® 371. When additional naphthenic oil was added to the carbon black-block copolymer blends, Shellflex ® 371 was utilized.

Compositions 1, 2 and 3 were prepared containing the components as described in Table 1. Compositions 1 and 2 were prepared by compounding the block copolymer and carbon black in a Banbury mill. The carbon black-block copolymer blend was then combined with the bitumen and mixed in a Silverson high shear mixer for about one hour. In this process, the bitumen was heated to 160° C., then the carbon black-block copolymer mixture was added.

Composition 3 was a comparative composition prepared by a process taught by Nielsen in Great Britain Patent Specification No. 1,143,895. A carbon black of grade N-110 (ASTM D-2516) was blended with bitumen b. The bitumen-carbon black blend was then combined with the naphthenic oil and the block copolymer in a Silverson high shear mixer and mixed for about one hour, beginning at a temperature of about 160° C., and ending at a temperature of 200° C.

Compositions 4 and 5 were comparative examples which did not contain carbon black. Compositions 4 and 5 were prepared by blending the hydrogenated block copolymer into bitumens a and b respectively in a Silverson high shear mixer for about 1 hour at a temperature of about 160° C.

The compatibility of the compositions was measured as the fraction by weight of polymer rich phase ("FPR") of a sample which had been stored for 5 days at a temperature of 160° C. A FPR of 100% indicates that the composition did not phase separate during this time period. The compositions were stored under a nitrogen blanked during this 5 day period. Table 2 includes the FPR and tensile energy to fail properties of the five compositions. Tensile Energy to Fail was determined according to ASTM test method D412, using size "D" dies and a crosshead speed of 10"/min.

It can be seen from Table 2 that only the compositions prepared according to the process of the present invention had a 100% FPR. This is an extremely important characteristic for bitumen compositions which must be stored before application, such as roofing compositions. Joint compounds, adhesives and paving compositions would also greatly benefit from this improved compatibility. It can also be seen from Table 2 that the Tensile Energy to Break was improved for identical asphalts when the block copolymer was added by the process of this invention. A similar "Tensile Energy to Break" composition could therefore be prepared using less block copolymer when the present invention is practiced. Because the block copolymer is an expensive component of these compositions, this results in a less expensive composition.

TABLE 1

| | Composition | | | | |
|---|---|---|---|---|---|
| | 1[1] | 2[1] | 3[2] | 4 | 5 |
| Parts by Weight | | | | | |
| Bitumen a | 85 | — | — | 88 | — |
| Bitumen b | — | 85 | 85 | — | 88 |
| Block Copolymer | 12 | 12 | 12 | 12 | 12 |
| Carbon Black | 2.3 | 2.3 | 2.3 | 0 | 0 |
| Naphthenic Oil | 0.7 | 0.7 | 0.7 | 0 | 0 |

[1]Compositions 1 and 2 were prepared by mixing pellets of carbon black in which the naphthenic oil was used as a binder with the block copolymers, then combining with the bitumen.
[2]Composition 3 was prepared by blending the asphalt and carbon black first, then combining the asphalt and carbon black blend with the remaining components.

TABLE 2

| | Composition | | | | |
|---|---|---|---|---|---|
| | 1 | 2 | 3 | 4 | 5 |
| FPR % w | 100 | 100 | 60 | 63 | 74 |
| Tensile Energy to Failure lb-in | 12 | 16 | 13 | 11 | 13 |

EXAMPLE 2

This example demonstrates the improvement in retention of tensile strength of the composition produced by the method of this invention over bitumen-block copolymer mixtures which do not contain carbon black.

Three different bitumens were utilized, bitumens c, d and e. These bitumens were all Grade AC-20 asphalts. The block copolymer utilized was identical to the block copolymer of Example 1. The carbon black pellets bound by naphthenic oil were also identical to those used in Example 1.

Compositions 6, 8 and 10 were prepared according to the process of this invention, using the same procedure as was used for Compositions 1 and 2. Compositions 7, 9 and 11 did not contain carbon black, and were prepared using the same procedure as was used for Compositions 4 and 5.

The six compositions of Example 2 were divided into aliquots and the aliquots were stored at 70° C. Tensile Energy to Failure, in lb-in, was measured initially, and after 500, 1000 and 1500 hours of storage at 70° C. Table 3 lists the contents of Compositions 6 through 11, along with the Tensile Energy to Failure data.

Aliquots of compositions 6 through 11 were also stored at 160° C. for five days to measure the storage stability, as described in Example 1. Compositions 6, 8 and 10 each had a 100% FPR after the five days whereas Compositions 7, 9 and 11 showed phase separation having FPR's of 48%, 39% and 55% respectively. These compositions, like compositions 1 and 2, could be stored after preparation without requiring remixing before use due to improved storage stability.

It can be seen from Table 3 that each of the compositions prepared according to the process of this invention maintained an excellent Tensile Energy to Failure over the duration of the aging test. Although one of the examples which did not contain carbon black, Composition 9, also maintained a good Tensile Energy to Failure over the duration of the test, the other two compositions deteriorated rapidly in Tensile Energy to Failure. This indicates that the process of this invention can serve to widen the types of asphalts successfully used with block copolymers.

TABLE 3

| Parts by Weight | Composition | | | | | |
| --- | --- | --- | --- | --- | --- | --- |
|  | 6 | 7 | 8 | 9 | 10 | 11 |
| Bitumen c | 85 | 88 |  |  |  |  |
| d |  |  | 85 | 88 |  |  |
| e |  |  |  |  | 85 | 88 |
| Block Copolymer | 12 | 12 | 12 | 12 | 12 | 12 |
| Carbon Black | 2.3 | 0 | 2.3 | 0 | 2.3 | 0 |
| Naphthenic Oil | 0.7 | 0 | 0.7 | 0 | 0.7 | 0 |
| Tensile Energy to Failure Lb-In (Hrs. of Aging at 70°) |  |  |  |  |  |  |
| 0 Hrs. | 10.4 | 10.2 | 14.9 | 18.4 | 14.3 | 12.4 |
| 500 Hrs. | 22.0 | 15.7 | 21.5 | 16.4 | 17.9 | 10.8 |
| 1000 Hrs. | 16.9 | 1.2 | 22.9 | 17.1 | 19.0 | 1.3 |
| 1500 Hrs. | 9.0 | 1.4 | 19.5 | 21.7 | 22.9 | 0.3 |
| FPR % weight | 100 | 48 | 100 | 39 | 100 | 55 |

I claim:

1. A process to produce a bitumen composition, the process comprising the steps of:
   a) providing a carbon black composition comprising carbon black with less than 10% by weight of the carbon black composition being bitumen and carbon black particles being of a particle size of from 5 to 500 nanometers;
   b) blending the carbon black composition with 2 or more parts by weight of a block copolymer and less than 10% by weight bitumen, based on the total amount of block copolymer composition, the block copolymer selected from the group consisting of hydrogenated and unhydrogenated block copolymers, the block copolymer, before hydrogenation, comprising at least two blocks A, the blocks A comprising predominantly polymerized vinyl arene monomer units, and at least one block B, the block B comprising predominantly polymerized conjugated diolefin monomer units wherein the weight ratio of block copolymer to carbon black is in the range of from about 0.01 to about 500; and
   c) combining the carbon black composition block copolymer blend with an amount of bitumen which results in 100 parts by weight of bitumen plus block copolymer to form a polymeric bitumen composition.

2. The process of claim 1 wherein the carbon black composition is blended with the block copolymer composition in a high shear mixing device.

3. The process of claim 1 wherein the carbon black composition-block copolymer blend is combined with the bitumen in a high shear mixing device.

4. The process of claim 1 wherein the carbon black composition is essentially free of bitumen.

5. The process of claim 1 wherein the block copolymer is a linear block copolymer.

6. The process of claim 1 wherein the block copolymer is an ABA block copolymer.

7. The process of claim 1 wherein the block copolymer is a radial block copolymer.

8. The process of claim 1 wherein the blocks A are predominantly polymerized styrene.

9. The process of claim 1 wherein the conjugated diolefin monomers are conjugated diolefins having from 4 to 8 carbon atoms.

10. The process of claim 1 wherein the block B is predominantly polymerized butadiene.

11. The process of claim 1 wherein the block B is predominantly polymerized isoprene.

12. The process of claim 1 wherein the carbon black particles are in the form of pellets bound by a naphthenic oil binder.

13. The process of claim 1 wherein the block copolymer is hydrogenated, reducing the ethylenic unsaturation to less than 20% of initial ethylenic unsaturation.

14. The process of claim 1 wherein the weight ratio of block copolymer to carbon black is between about 1.0 and about 100.

15. The process of claim 1 wherein the amount of block copolymer utilized is between about 2 weight percent and about 25 weight percent based on the amount of bitumen plus block copolymer.

16. The process of claim 1 wherein the bitumen has a softening point between about 80° F. and about 220° F.

17. The process of claim 1 wherein the carbon black composition is blended with the block copolymer composition in a high shear milling device.

18. The process of claim 1 wherein the carbon black composition-block copolymer blend is combined with the bitumen in a high shear rotor/stator disintegrator.

19. The process of claim 1 wherein the carbon black composition-block copolymer blend is combined with the bitumen in a high shear in-line mixing device.

20. The product of the process of claim 1.

* * * * *